United States Patent [19]
Kreuzer

[11] 3,873,917
[45] Mar. 25, 1975

[54] MEASURING BRIDGE CIRCUIT
[75] Inventor: Manfred Kreuzer, Weiterstadt, Germany
[73] Assignee: Hottinger-Baldwin-Messtechnik GmbH, Darmstadt, Germany
[22] Filed: Mar. 6, 1974
[21] Appl. No.: 448,453

[30] Foreign Application Priority Data
  Mar. 24, 1973 Germany............................ 2314754

[52] U.S. Cl.............................. 324/62, 324/DIG. 1
[51] Int. Cl................................................ G01r 27/02
[58] Field of Search......................... 324/62, DIG. 1

[56] References Cited
  FOREIGN PATENTS OR APPLICATIONS
  1,900,708   8/1970   Germany.............................. 324/62

Primary Examiner—Stanley T. Krawczewicz
Attorney, Agent, or Firm—Wolfgang G. Fasse; Willard W. Roberts

[57] ABSTRACT

The present measuring bridge circuit is especially suitable for a plurality of measuring points. One measuring bridge branch is provided for each measuring point. Selectively operable switching means interconnect each measuring bridge branch, and if desired also at least one compensating bridge branch, to a voltage supply source. In order to compensate for any voltage drops across these selectively operable switching means, supply voltage control means are provided which regulate or continuously adjust the output voltage of the supply voltage source in response to said voltage drop. In an alternate embodiment of the invention, a high impedance complementary half bridge circuit is connected through selectively operable further switching means to the other bridge branches. A control of the supply voltage may be accomplished by means of an amplitude comparing circuit.

18 Claims, 12 Drawing Figures

3,873,917

MEASURING BRIDGE CIRCUIT

BACKGROUND OF THE INVENTION

The invention relates to a measuring bridge circuit, especially one comprising a plurality of measuring bridge branches for a respective plurality of measuring points. Each measuring point may comprise a measuring resistance and if desired also a compensating resistance. A supply voltage source is selectively connectable to one or both ends of the measuring bridge branches by means of manually operable selector switching means respectively arranged between one or both ends of the measuring bridge branches and said voltage supply source.

Heretofore, it has been frequently the practice to sequentially switch homogeneous measuring resistors of the same kind into the same bridge to reduce the circuit costs. If such measuring resistors provide only relatively small resistance variations as do, for example, foil strain gauges, the measurement may be completely falsified by the varying contact resistances of the switching means.

Circuit arrangements for avoiding said disadvantageous effects are known in the art. Thus, errors due to the influence of the contact resistance of the supply voltage switching means have been reduced by feeding the switched supply voltage through a further switch to the complementary half bridge circuit. The use of two switching means reduces the null or zero error as compared to the normal arrangement in which the supply voltage is fed directly to the complementary half bridge circuit. However, the sensitivity errors caused by the contact resistances of the switches are not reduced in prior art arrangements. To the contrary, such sensitivity errors are increased in prior art arrangements since the contact resistances of any two switches might not be uniform.

Due to the large influence of the resistances of the switching contacts, it appeared to have been impossible so far to employ such switches as semiconductor switches, dry read switches or the like for the switching functions in bridge circuit arrangements, although such switches have a relatively high on-resistance or on-impedance. For example, semiconductor switches have switching resistances typically in the range of about 10 to 100 ohms. However, contact resistances of the switches employed in bridge circuits should be less than $1 \times 10^{-3}$ ohms. Thus, semiconductor switches have not been considered to be suitable for use in measuring circuit arrangements in spite of their high reliability, in spite of their high switching speeds and in spite of the fact that they are substantially free of any wear and tear. For these reasons, it has been suggested, for example in German Pat. Publication 1,944,400, to use, instead of measuring bridge circuits, constant current circuit arrangements or circuit arrangements the current of which is independent of the load in order to be able to take advantage of semiconductor switching means, please see in this connection German Pat. Publication 1,944,400.

OBJECTS OF THE INVENTION

In view of the foregoing, it is the aim of the invention to achieve the following objects, singly or in combination:

to provide a measuring bridge circuit configuration which advantageously will use the desirable characteristics of semiconductor switches and of operational amplifier switches;

to avoid the drawbacks of the prior art while simultaneously combining the advantages of semiconductor switches with the advantages inherent in measuring bridge circuit arrangements;

to compensate for any voltage drops which might occur across the switching means employed in the switching of circuit components in a measuring circuit;

to connect the bridge diagonal of a measuring bridge circuit through impedance converting means to an operational amplifier in order to avoid leakage currents in the output of the operational amplifiers;

to employ a complementary high impedance half bridge circuit selectively connectable to the respective measuring bridge branch;

to employ a resonance circuit tuned to the frequency of the bridge supply voltage, as the complementary half bridge circuit;

to employ impedance convertor means for reducing the high output impedance of the complementary half bridge circuit;

to employ impedance convertor means for increasing the input impedance of the complementary half bridge circuit; and to employ for all switching functions in the entire bridge circuit configuration semiconductor switches or operational amplifier type switches.

SUMMARY OF THE INVENTION

According to the invention there is provided a measuring bridge circuit comprising a plurality of bridge branch circuits including a corresponding plurality of measuring points. If desired, the circuit may also comprise a compensating bridge branch. The measuring bridge branch, and if desired also the compensating bridge branch, are selectively connectable through respective semiconductor or operational amplifier switches to the bridge supply voltage source. Voltage control means are provided which in response to a feedback signal corresponding to the voltage drop caused by such switching means continuously adjust or regulate the supply voltage source so that the voltage appearing at the point where the feedback control signal is derived corresponds continuously to a predetermined value.

The control means may comprise an operational amplifier having an inverting and a non-inverting input. In an alternative embodiment, the control means may comprise an amplitude comparing circuit arrangement which compares voltage amplitudes derived from the bridge circuit with a reference voltage. The resulting difference signal is then employed for regulating the supply voltage generator.

To assure a null or zero stability under all circumstances, the invention teaches to employ additionally to the above features or in the alternative, a high impedance complementary half bridge circuit which is arranged to cooperate with any one of the measuring bridge branches or which may be switched into such a cooperating circuit configuration to form a complete bridge comprising the measuring bridge branch or branches and the complementary high impedance half bridge.

BRIEF FIGURE DESCRIPTION

In order that the invention may be clearly understood, it will now be described, by way of example, with reference to the accompanying drawings, wherein.

Figure 8:
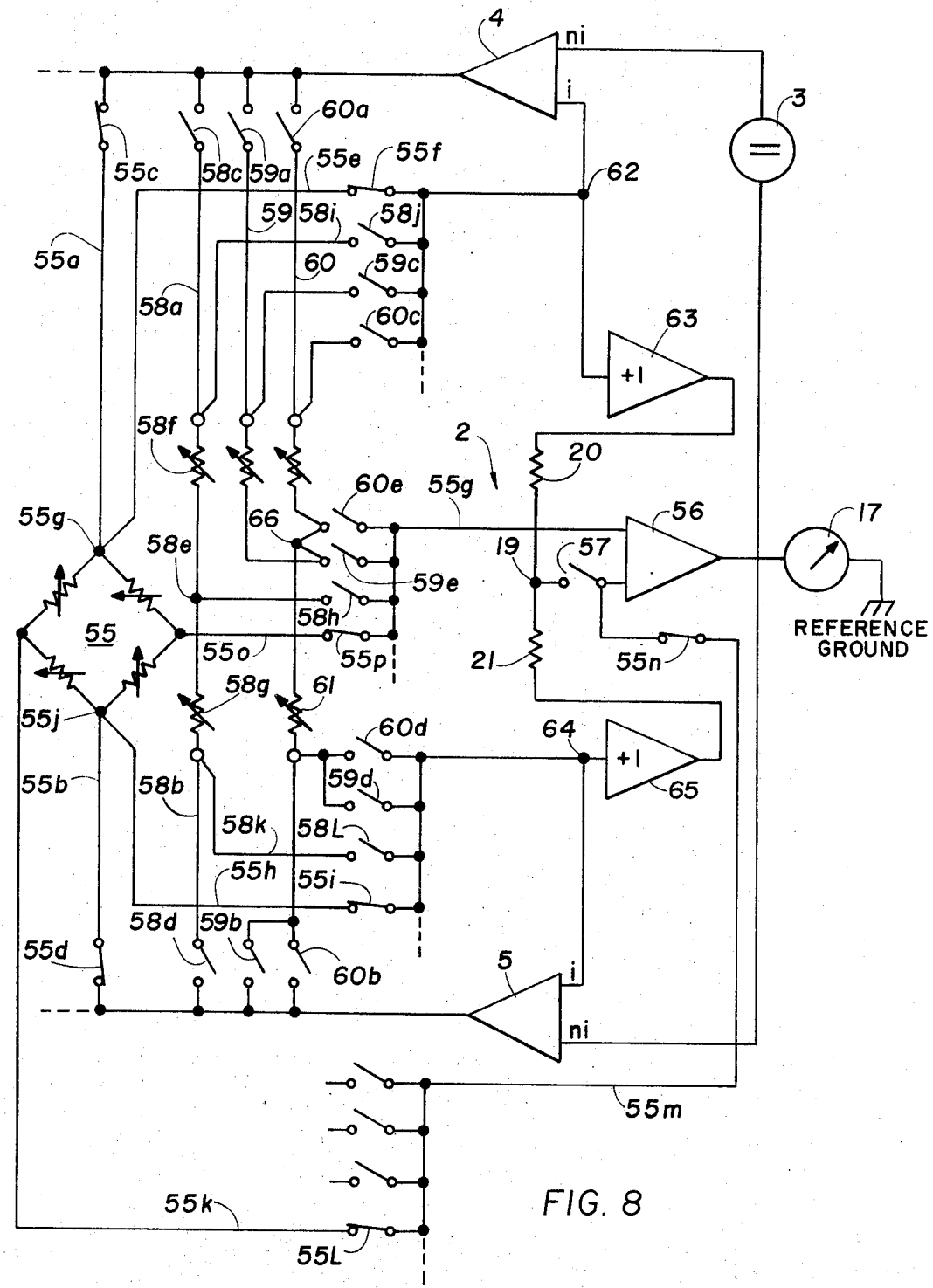
Figure 9:
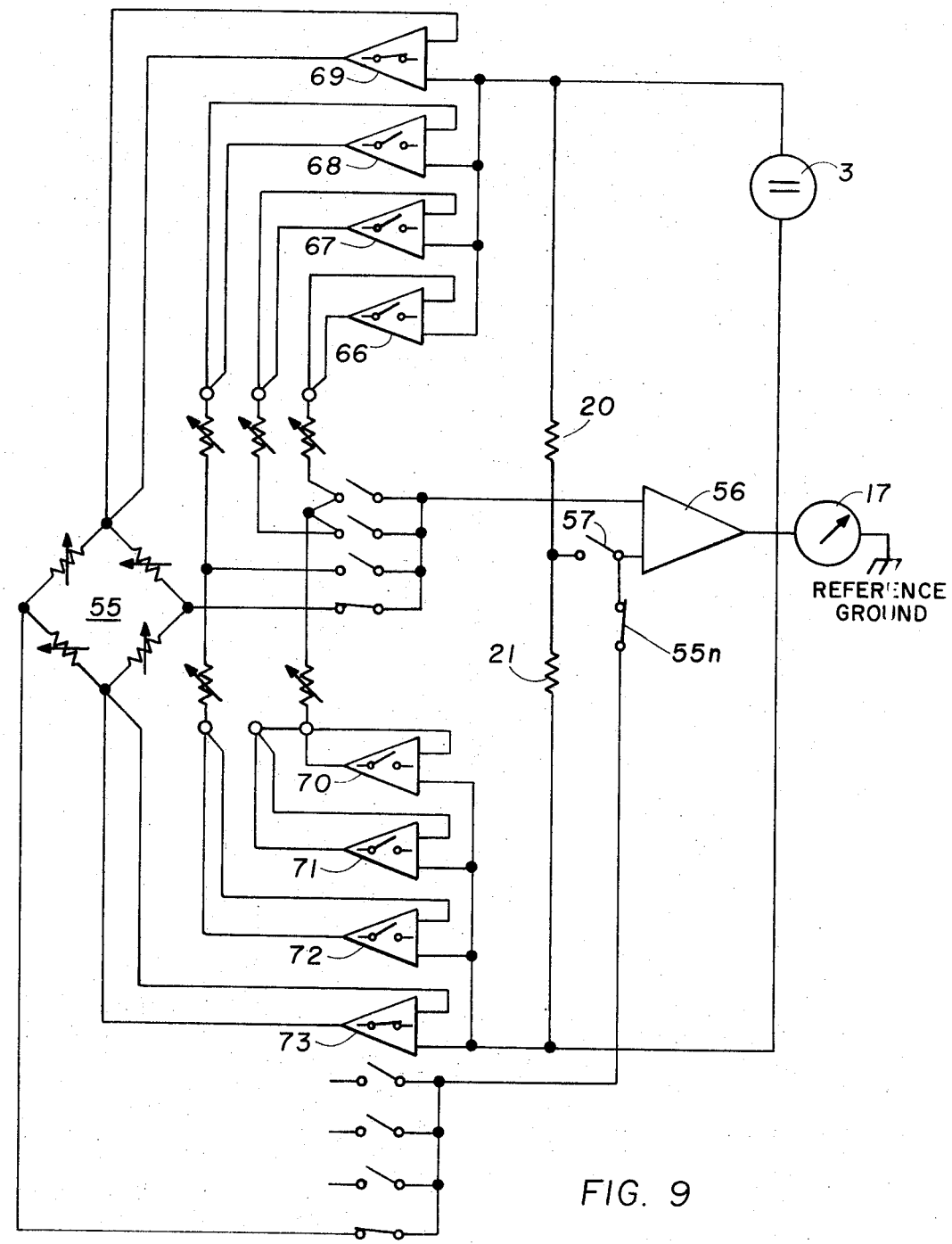
Figure 10:
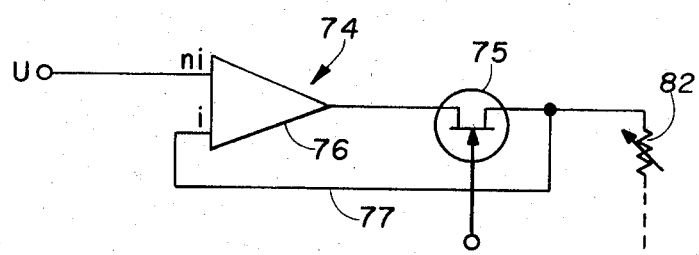
Figure 11:
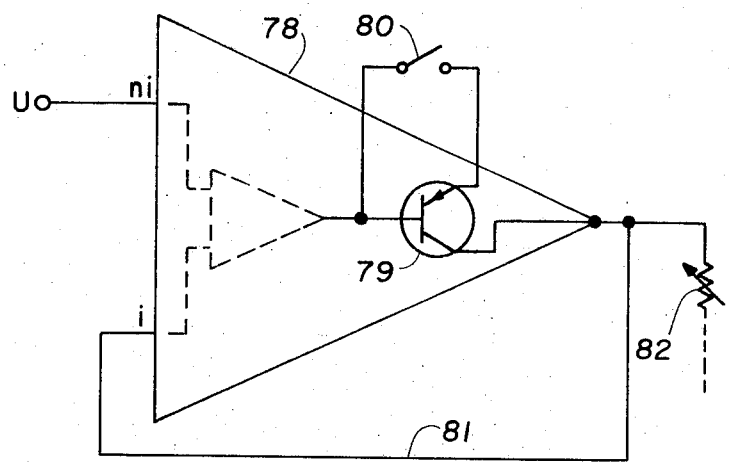
Figure 12:
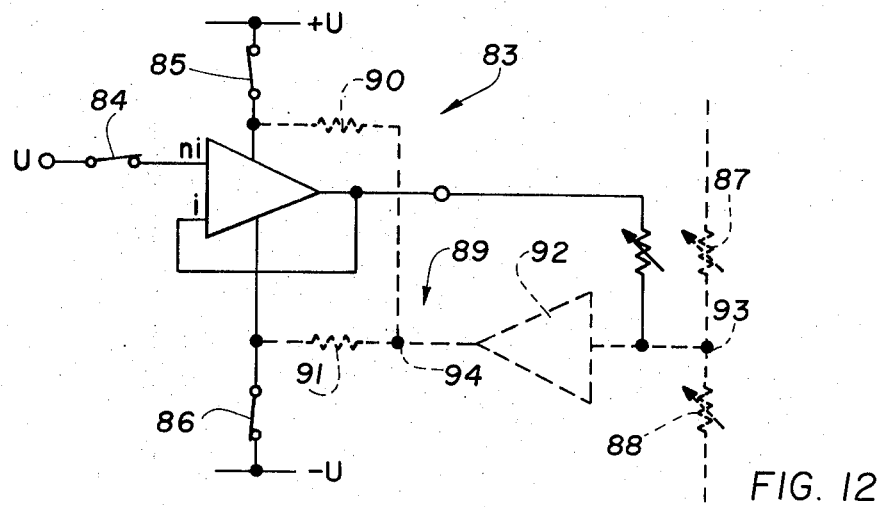

FIG. 8 shows a full bridge circuit arrangement with a plurality of measuring points, certain of the bridge branches forming the measuring half bridges are selectively connectable through respective switching means at both ends to corresponding supply voltage control means and wherein the high impedance half bridge is connectable to form a full bridge through respective further switching means operable in synchronism with the first mentioned switching means;

FIG. 9 illustrates an embodiment similar to that of FIG. 8, however, each measuring bridge branch is provided with its own supply voltage control means;

FIG. 10 illustrates an embodiment for the supply voltage switching means in the form of an operational amplifier with a controllable output transistor;

FIG. 11 illustrates another embodiment which may be used as the switching means in the bridge circuits according to the invention, said switching means including an operational amplifier with a controllable collector output; and FIG. 12 illustrates a still further switching means, especially a supply voltage switching means comprising an operational amplifier wherein the input voltage as well as the output voltage or operating voltage may be switched off.

DETAILED DESCRIPTION OF EXAMPLE EMBODIMENTS

Figure 1:
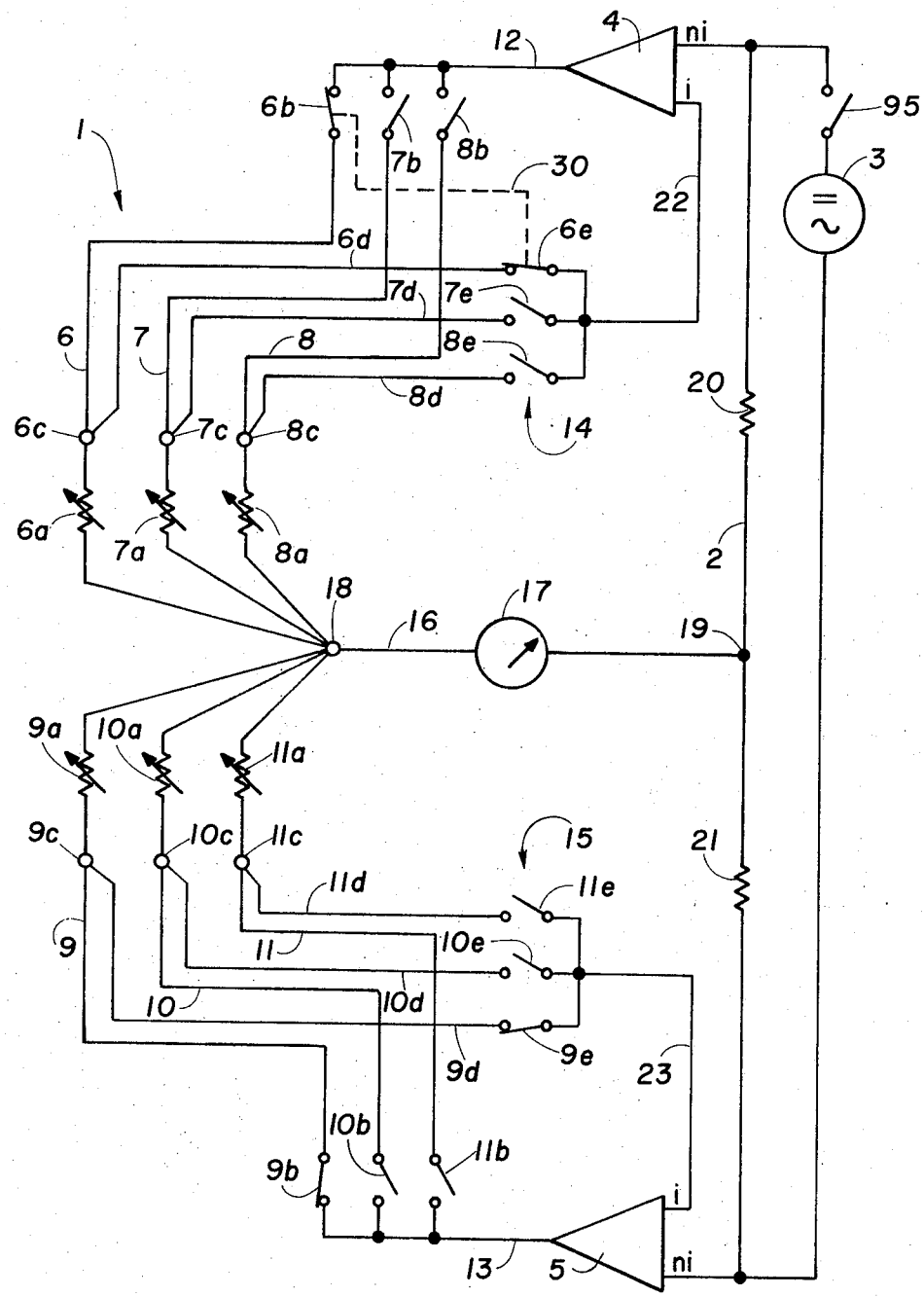
FIG. 1 illustrates a measuring bridge circuit arrangement comprising a plurality of measuring bridge branches forming a half bridge both ends of which are selectively connectable to a supply voltage source, a supplementary half bridge completes the full bridge circuit and operational amplifiers are provided as control or regulating means.

Referring to FIG. 1 there is shown a first embodiment of a measuring bridge circuit according to the invention comprising a measuring half bridge 1, a complementary half bridge 2, a voltage supply source 3 and voltage control or regulating means 4 and 5. The measuring half bridge 1 comprises a plurality of measuring bridge branches 6, 7, 8, 9, 10 and 11. Each measuring bridge branch comprises a measuring point as represented by a respective measuring resistor 6a, 7a, 8a, 9a, 10a, and 11a. Selectively operable switching means 6b, 7b, and 8b connect the respective bridge branches 6, 7, and 8 to the output 12 of the voltage control means 4. Similarly, selectively operable switching means 9b, 10b, and 11b connect the respective bridge branches 9, 10, and 11 to the output 13 of the voltage control means 5. Each measuring bridge branch 6 to 11 is provided with a respective voltage tap 6c, 7c, 8c, 9c, 10c, and 11c. These voltage taps are connected through feedback means 14 and 15 to a control input of the control means 4 and 5 respectively. The measuring diagonal 16 comprising an indicating instrument 17 is connected across the common measuring point 18 and the junction 19 of the high impedance half bridge 2 comprising two resistors 20 and 21 forming on the one hand said junction 19 and connected on the other hand to another control input of the respective voltage control means 4 and 5.

The feedback circuit means 14 comprise tap lines 6d, 7d, and 8d connected to the respective voltage taps 6c, 7c, and 8c as well as to selectively operable switching means 6e, 7e, and 8e. A common conductor 22 connects the just mentioned switches to a control input of the voltage control means 4. Similarly, the feedback means 15 comprise tap lines 9d, 10d, and 11d connected on the one hand to the respective voltage taps 9c, 10c, and 11c, and on the other hand to respective selectively operable switching means 9e, 10e, and 11e. A common conductor 23 connects the just mentioned switches to one control input of the control means 5.

Each of the voltage control means 4 and 5 comprise an operational amplifier having an inverting input "$i$" and a non-inverting input "$ni$".

The outer ends of the complementary half bridge 2 are connected to the non-inverting inputs of the operational amplifiers 4 and 5 respectively. The conductors 22 and 23 are connected to the inverting control inputs of the respective operational amplifier 4 and 5. Incidentally, the resistors 20 and 21 of the complementary half bridge 2 may, for instance, be in the range of 1 $k\Omega$, since half bridge 2 is directly connected to the supply source.

Any of the bridge branches may be connected to the voltage supply source 3 through the respectively selectable switch means 6b to 11b. As shown, the measuring bridge branches 6 and 9 are connected to complete the full bridge which is supplied by the voltage supply source 3 connected with its terminals to the non-inverting control inputs of the operational amplifiers 4 and 5.

Figure 2:
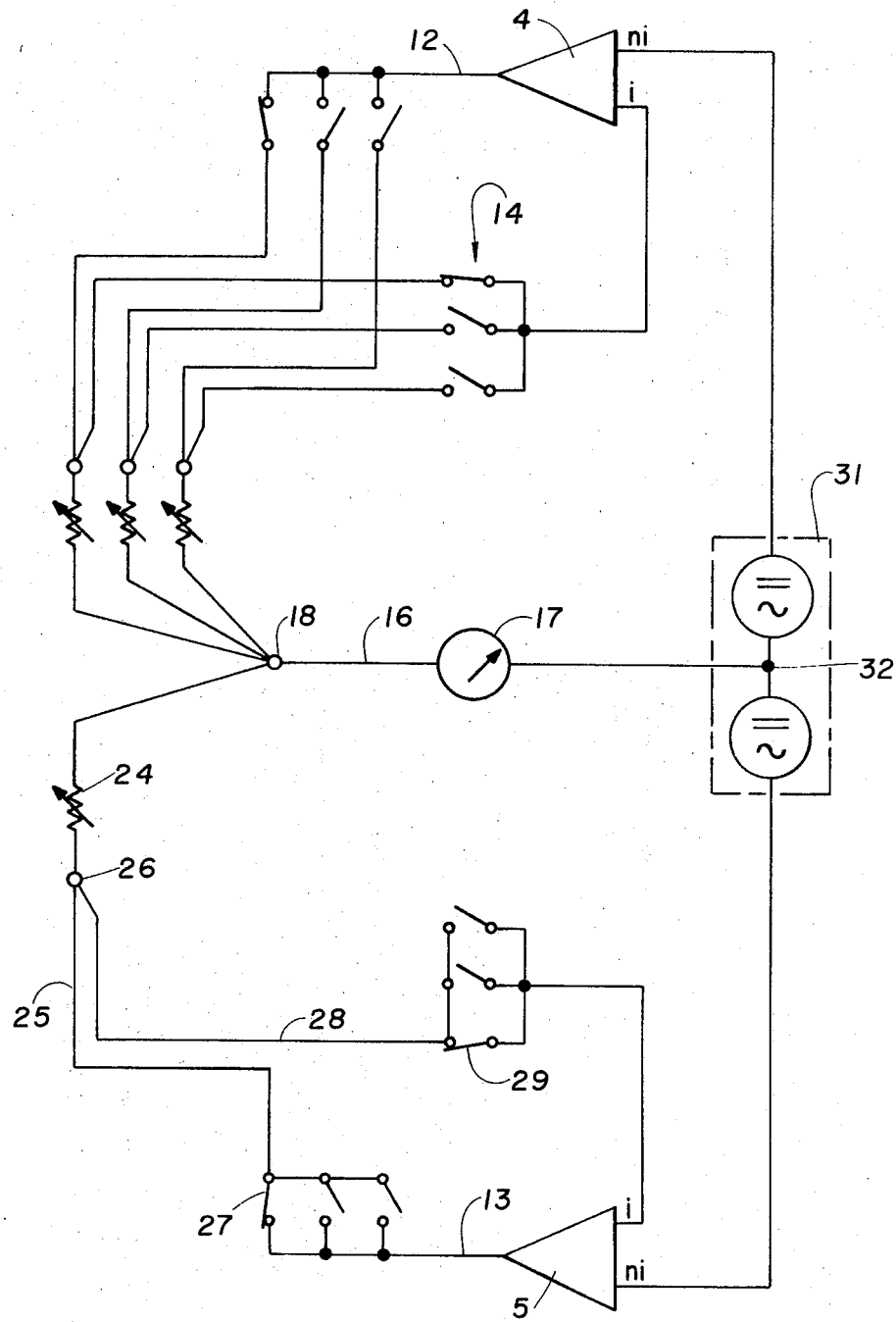
FIG. 2 illustrates an embodiment corresponding substantially to that of FIG. 1, however, the supplementary half bridge circuit is modified and one bridge branch forms a compensating bridge branch.

Instead of using two measuring resistors in each measuring half bridge 6, 9 or 7, 10 or 8, 11 it is also possible to employ a measuring resistor and a compensating resistor for forming the measuring half bridge. As illustrated in FIG. 2, it is also possible to employ a common compensating resistor 24 in a single compensating branch 25 including a voltage tap 26, the branch 25 is connected to the output 13 of the operational amplifier 5 through a switch 27 and a feedback circuit 28 with a switch 29 connects the voltage tap 26 to the inverting input of the operational amplifier 5. The upper left hand portion of the embodiment of FIG. 2 corresponds to that of FIG. 1. Therefore, and for simplicity's sake most of the reference numerals are not repeated for the same elements in FIG. 2. The lower left hand portion of FIG. 1 could be replaced by the lower left hand portion of FIG. 2 and vice versa.

The dashed-line 30 in FIG. 1 between the switches 6b and 6e is intended to illustrate that these switches are operable in unison or synchronism with each other. Similarly, the other switch pairs, such as 7b and 7e and so forth, are also operable in synchronism with each other if desired.

In an actual circuit embodiment, the taps 6c, 7c, 8c, and so on should be located as close as possible to the respective measuring resistors 6a, 7a, 8a, and so on. Due to the feedback control means 14 and 15 according to the invention, the operational amplifiers 4 and 5 vary their output voltages in such a manner that the voltage at the inverting input of the operational amplifiers 4 and 5 becomes equal to the voltage supplied to the respective non-inverting input. This arrangement compensates for any voltage drops caused by resistances in the circuit means between the outputs of the operational amplifiers and the measuring resistors including any voltage drops across the switches 6b and so forth. Voltage drops do not occur in the feedback means between the measuring points and the inverting input of the operational amplifiers because each inverting input constitutes a high impedance.

Referring again to the embodiment of FIG. 2, it will be noted that the voltage supply source 31 comprises two equal portions which simultaneously provide a complementary half bridge. One terminal of the measuring or indicating instrument 17 is connected to the center tap 32 of the voltage supply source 31. As mentioned above, the compensating resistor 24 in FIG. 2 is provided for all measuring bridge branches and the other terminal of the instrument 17 is connected to the junction 18 between the compensating resistor and the measuring resistors.

Figure 3:
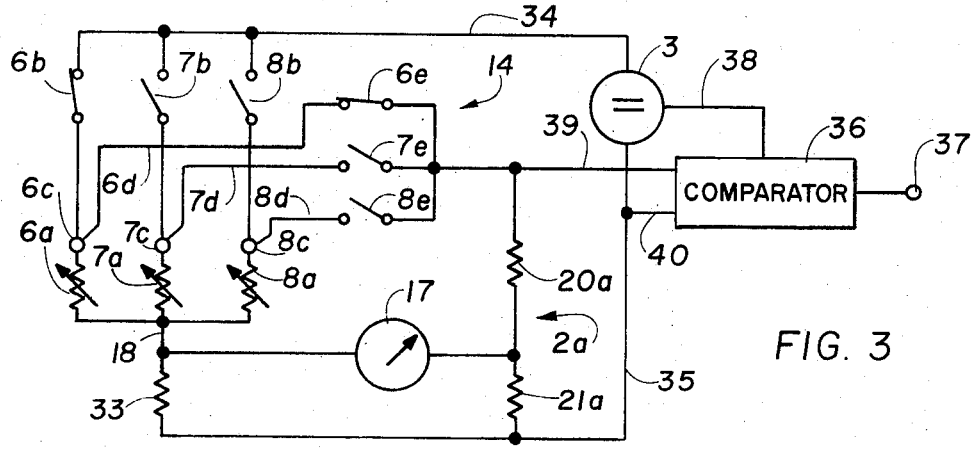
FIG. 3 shows an arrangement in which the measuring bridge branches are connected with one end thereof to a voltage supply means which is controlled by an amplitude comparing circuit.

Referring to FIG. 3, it will be noted that the upper left hand portion of the embodiment illustrated in FIG. 3 corresponds to the upper left hand portion of FIG. 1. Therefore, the same reference numerals are employed. A common compensating resistor 33 is connected between the diagonal point 18 and the lower end of a complementary high impedance half bridge 2a. The complementary half bridge 2a is a high impedance bridge. The resistors 20a and 21a of half bridge 2a would be in the order of about 100 $k\Omega$, in order to avoid voltage drops across the switches 6e, 7e, 8e. The measuring instrument 17 is also connected as in FIG. 1. However, the voltage supply source 3 is directly connected through a common conductor 34 to the switches 6b, 7b, and 8b. The other terminal of the supply source 3 is connected through a conductor 35 to the lower end of the high impedance half bridge 2a and the compensating resistor 33.

Voltage control means are provided in FIG. 3 in the form of an amplitude comparator circuit 36 having a reference input 37, a control output 38, and comparing inputs 39 and 40. The comparing input 39 is connected to the upper end of the high impedance half bridge 2a and to the feedback means 14. The other comparing input 40 is connected to the conductor 35 and thus to the lower end of the high impedance half bridge 2a and to the compensating resistor 33.

In operation, the voltages derived from the feedback means 14 and from the compensating resistor 33 are compared with a reference voltage supplied to the reference input 37 of the comparator 36 by a reference voltage source not shown. The comparator 36 operates as an amplitude control means and produces a control or regulating signal at its output 38 in response to a deviation of the signals on input lines 39 and 40 with the reference signal. The resulting control signal is employed to regulate the output voltage of the supply voltage source 3 in such a manner that the amplitude of the voltage supplied to the measuring resistors 6a, 7a, and 8a has the desired value.

Figure 4:
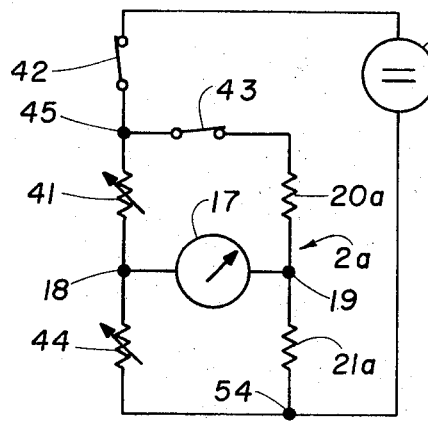
FIG. 4 shows an embodiment in which one end of a measuring half bridge is connected through first switch means to a voltage supply means and a high impedance complementary half bridge is connectable through second switch means to said one end of the measuring half bridge.

FIG. 4 illustrates a modified embodiment according to the invention which shows that using a high impedance complementary half bridge such as 2a alone is sufficient in those instances where certain changes in the sensitivity of the measuring bridge can be tolerated and where it is mainly required to assure the null or zero point constancy. Only one measuring half bridge is illustrated in FIG. 4. However, it will be appreciated that several such circuits may be employed as illustrated, for example, in FIGS. 1 and 2. The measuring resistor 41 is connected through a switch 42 to one terminal of the voltage supply source 3. The other measuring resistor 44 is connected to the other terminal of the source 3. The complementary high impedance half bridge 2a is connected through a switch 43 to the junction 45 between the measuring resistor 41 and the switch 42. The measuring instrument 17 is connected across the bridge diagonal between the junctions 18 and 19 as shown in FIG. 1. The resistors 20a and 21a again would have a high resistance value, for example in the order of 100 $k\Omega$ as in FIG. 3.

In operation, the just described arrangement of FIG. 4 will be useful in all those instances where certain sensitivity variations due to the voltage drop across the switch 42 may be tolerated. However, the constancy of the null or zero point is not influenced by the voltage drop across the voltage supply switch 42. Due to the large impedance of the complementary half bridge 2a any voltage drops across the switch 43 are suffiently small so that they may be disregarded. Accordingly, these small voltage drops do not have any substantial influence on the null or zero point constancy.

Figure 5:
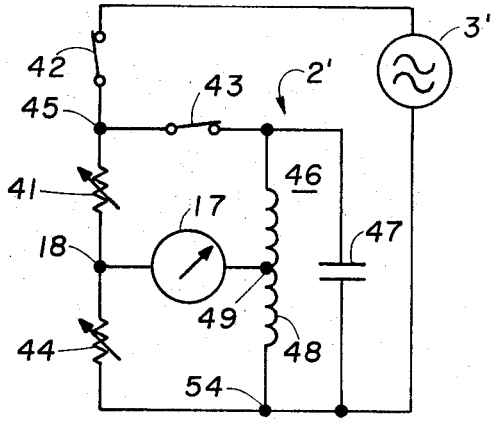
FIG. 5 illustrates an embodiment similar to that of FIG. 4, however, the complementary high impedance half bridge is a resonance circuit and the supply voltage generator supplies the bridge with a voltage the frequency of which corresponds to the resonance frequency of said complementary half bridge resonance circuit.

The embodiment of FIG. 5 illustrates a modification of the embodiment according to FIG. 4. The measuring half bridge is the same as in FIG. 4. Accordingly, the same reference numerals are employed. However, the voltage supply source 3' provides an alternating supply voltage and the complementary half bridge circuit 2' comprises a resonance circuit 46 including a capacitor 47 and an inductive coil 48 having a center tap 49. The resonance circuit 46 is tuned to the frequency of the supply voltage. Due to the high resonance impedance the complementary half bridge 2' provides the same advantages as described above with reference to FIG. 4 at the frequency of the supply voltage. However, any disturbing voltages having another frequency are effectively grounded through the supply voltage source 3' because with regard to these other frequencies the resonance circuit 46 constitutes a low impedance circuit. Accordingly, such disturbing voltages do not appear across the measuring half bridge.

Figure 6:
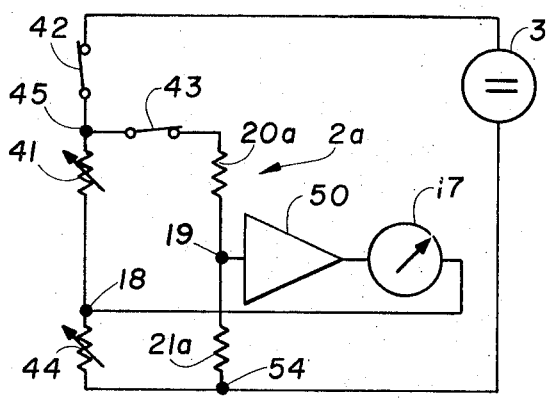
FIG. 6 is again a circuit arrangement similar to that of FIG. 4, however, an impedance convertor is connected between a measuring instrument and the junction between two high value resistors forming the complementary half bridge.

FIG. 6 again illustrates an embodiment quite similar to that of FIG. 4 and again the same reference numerals are employed for the same elements as in FIG. 4. However, in FIG. 6 the measuring instrument 17 is connected across the bridge diagonal through an impedance convertor 50 which reduces the high output impedance of the complementary half bridge 2a to a lower value. This feature has the advantage that the output voltage of the measuring bridge circuit becomes less dependent on the load resulting from the input impedance of the instrument 17.

Figure 7:
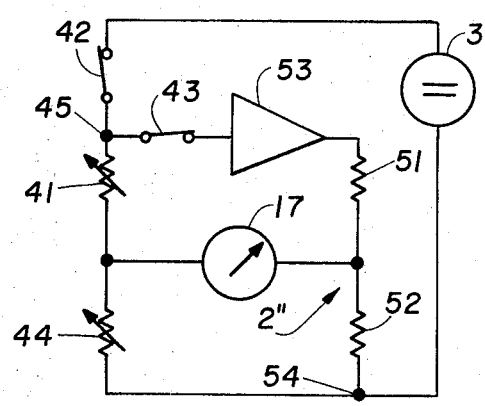
FIG. 7 illustrates an embodiment in which an impedance convertor is located between the measuring half bridge and the complementary high impedance half bridge.

In FIG. 7 the embodiment is again similar to that of FIG. 4. However, the complementary half bridge 2'' comprises resistors 51 and 52 each having a low resistance value, for example, of the order of $1k\Omega$. An impedance converter 53 is interposed between the switch 43 and the upper end of the half bridge 2''. Thus, the impedance of the half bridge 2'' becomes a high impedance input whereby the above described advantages are also realized. Simultaneously, the output impedance of the half bridge 2'' is sufficiently low to achieve the same advantages as in the embodiment of FIG. 6.

In the embodiments of FIGS. 4, 5, 6, and 7 it will be appreciated, that further switching means could be provided between the measuring resistors 44 and the junction 54, if desired.

FIG. 8 illustrates a complete multiposition measuring arrangement comprising, for example, four measuring points whereby different embodiments as discussed above are employed in the several bridge circuit means. In this embodiment, a first measuring point comprises a full bridge circuit 55 with a first supply conductor 55a and a second supply conductor 55b. The first supply conductor 55a is connected to the voltage supply source 3 through a switch 55c and through the voltage control means 4 as described with reference to FIG. 1. Similarly, the second supply conductor 55b is connected through a switch 55d and the voltage control means 5 to the supply source 3. A feedback circuit 55e comprising a switch 55f is connected between the inverting input "i" of the voltage control operational amplifier 4 and the junction 55g. Similarly, a further feedback circuit 55h including a switch 55i is connected between the inverting input of the operational amplifier 5 and the junction 55j of the full bridge 55. The measuring diagonal of the bridge 55 is connected through a conductor 55k, a switch 55l, a further conductor 55m and a further switch 55n to one input of an amplifier 56 the output of which is connected to the measuring instrument 17. The other leg of the measuring diagonal circuit of the full bridge 55 comprises a conductor 55o, a switch 55p and a further conductor 55q connected to a further input of the amplifier 56. The first mentioned input of the amplifier 56 is also connected through a switch 57 to the junction 19 between the resistors 20 and 21 of the high impedance complementary half bridge 2. The switch 57 is open when the switch 55n is closed and vice versa.

Referring further to FIG. 8, the half bridge measuring circuit with the branches 58a and 58b is connected in parallel to the above described full bridge measuring circuit 55 by means of switches of 58c and 58d. The diagonal point 58e between the measuring resistors 58f and 58g is connected through a switch 58h and the common conductor 55q to the other input of the amplifier 56. A feedback circuit 58i with a switch 58j connects the measuring branch 58a to the inverting input of the feed voltage control 4. similarly, a feedback circuit 58k with a switch 58l connects the branch 58b to the inverting input of the feed voltage control 5.

Two further measuring bridge branches 59 and 60 are connected to form with a common compensating resistor 61 two further measuring half bridges. Switches 59a and 59b connect half bridge 59 to the controlled voltage supply. Switches 60a and 60b similarly connect the half bridge 60 to the controlled voltage supply. Switches 59c and 59d provide a feedback control circuit for the half bridge 59 at both ends thereof. Similarly, switches 60c and 60d provide a feedback control circuit for the half bridge 60. The common point 62 of the feedback switches 55f, 58j, 59c, and 60c is connected through an amplifier 63 to the upper end of the complementary half bridge 2. Similarly, the common point 64 of the feedback switches 55i, 58l, 59d, and 60d is connected through an amplifier 65 to the lower end of the half bridge 2. Switches 59e and 60e connect the diagonal point 66 of the bridge branches 59 and 60 to the other input of the amplifier 56.

In operation, the circuit arrangement of FIG. 8 does not require a complementary half bridge if all the measuring bridges are full bridges, as shown by full bridge 55 for example. In this case, the switch 57 is opened as shown to switch off the half bridge 2. Simultaneously the switch 55n is closed to connect the diagonal of the bridge 55 to the measuring instrument 17, through an amplifier 55, if desired. The switches 55p, 58h, 59e, and 60e serve for the connection of one of the measuring diagonal points to the measuring instrument as discussed above. Similarly, the switches 55e, and the other switches in that group above serve for the connection of the other measuring diagonal point to the instrument if all the measuring points comprise a full bridge.

Rather than tuning the individual measuring points separately it is also possible to provide a tuning of the measuring arrangement by means of a central programmed tuning apparatus in a manner known as such. Such a central tuning device could, for example, be effective relative to the complementary half bridge 2. However, it is advantageous to arrange the central tuning device for cooperation with the amplifier 56 because in that instance, the tuning is also suitable for the embodiment where all measuring pints comprise a full bridge, such as shown at 55.

Further with regard to FIG. 8, it will be appreciated that the operational amplifiers 4 and 5 are effective in common for all measuring points. In contrast thereto, the embodiment of FIG. 9 illustrates the use of a separate operational amplifier 66, 67, 68, and 69 for each of the feedback control circuits of the upper bridge branches and a further separate individual operational amplifier 70, 71, 72, and 73 in each of the lower ends of the respective bridge branches. Otherwise the circuit arrangement of FIG. 9 is similar to that of FIG. 8. The operational amplifiers 66 to 73 shown in FIG. 9 must be of the type having an output which may be switched off, that is, the output must be switched into an "insulating" condition. FIGS. 10 to 12 show examples of such operational amplifier circuits which may be switched into an "insulating" operational state.

FIG. 10 illustrates an operational amplifier circuit 74 including a controlled transistor output 75. The supply voltage U is fed to the non-inverting input of the operational amplifier 76. If the output transistor 75 is blocked, the output impedance of the operational amplifier circuit rises toward infinity and the operational amplifier circuit is thus switched off. On the other hand, when the output transistor 75 is conducting, its output voltage is fed back through the feedback circuit 77 to the inverting input of the operational amplifier 76. As a result, the output voltage is controlled or continuously regulated to the desired value.

FIG. 11 illustrates a further embodiment of an operational amplifier 78, with a controllable output transistor 79. As long as the switch 80 is open, the circuit operates in the manner described above. Thus, the output voltage is continuously adjusted to the desired value through the feedback circuit 81. However, if the switch 80 is closed, the transistor 79 will be blocked and the output impedance of the operational amplifier rises toward infinity. As a result, the respective measuring point 82 is switched off.

FIG. 12 illustrates an operational amplifier circuit arrangement 83, in which the input voltage as well as the output voltage may be switched off. The switches 84, 85, and 86 are operable in unison with each other. If these switches are closed, the respective measuring bridge branches 87, 88 are switched on. If the switches 84, 85, and 86 are switched off or rather opened, the output impedance of the circuit arrangement 83 rises toward infinity, since the input voltage U and the operating voltage UB are both disconnected. If it is desired to also eliminate small leakage currents through the switches 84, 85, and 86, a respective compensating circuit 89 may be provided, as shown by dashed lines in FIG. 12. This compensating circuit 89 comprises two resistors 90 and 91 and an impedance convertor 92. The input of the impedance convertor 92 is connected to the junction 93 of the measuring diagonal. The output of the impedance convertor 92 is connected to the junction 94 of the resistors 90 and 91, the other ends of which are connected to the switches 85 and 86 respectively.

Incidentally, the supply voltage generator 3 may be connected into the circuit arrangement by an on-off switch 95, as for example illustrated in FIG. 1. The switch 95 acts as an input switching means and connects the non-inverting input of the operational amplifier 4 to the voltage supply generator 3.

For simplicity's sake simple switch symbols have been used in the accompanying drawings. However, it will be appreciated that all the illustrated switching means will be embodied by semi-conductor switching means or by operational amplifier circuits connected to operate as switching means, as especially disclosed with reference to FIGS. 10, 11, and 12.

Although the invention has been described with reference to specific example embodiments, it will be appreciated, that it is intended to cover all modifications and equivalents within the scope of the appended claims.

What is claimed is:

1. A measuring bridge circuit arrangement, comprising a plurality of bridge branches, a respective plurality of measuring points one of which is arranged in each bridge branch, resistance means in each bridge branch, a voltage source providing a supply voltage, supply voltage switching means connected to said supply voltage source and to said bridge branches for selectively interconnecting any bridge branch and said supply voltage source, said resistance means in each bridge branch being connected through said supply voltage switching means to said supply voltage source, voltage tap means located between said resistance means and the respective one of said supply voltage switching means, supply voltage control means connected to said supply voltage source, and feedback circuit means connecting said supply voltage control means to said voltage tap means whereby said supply voltage available at said voltage tap means is adjusted to keep it at a predetermined value.

2. The circuit arrangement according to claim 1, wherein said feedback circuit means comprise feedback switching means and switch control means operatively interconnecting said feedback switching means and said supply voltage switching means for operating said switching means synchroneously with each other.

3. The circuit arrangement according to claim 1, wherein said supply voltage control means comprise amplitude comparing circuit means connected to said voltage tap means, reference voltage means also connected to said amplitude comparing circuit means, and means connecting said comparing circuit means to said supply voltage source for adjusting said supply voltage source in response to a difference value produced by said amplitude comparing circuit means.

4. The circuit arrangement according to claim 1, wherein said supply voltage control means comprise an operational amplifier including an output, an inverting input and a non-inverting input, said supply voltage source being connected to said non-inverting input of said operational amplifier, said output being connected to said supply voltage switching means, and said inverting input of said operational amplifier being connected to said feedback circuit means.

5. The circuit arrangement according to claim 4, comprising input switching means connected between said non-inverting input of said operational amplifier and said voltage supply source.

6. The circuit arrangement according to claim 4, wherein said feedback circuit means comprise selective feedback switching means connected between said inverting input of said operational amplifier and said voltage tap means for selectively connecting said inverting input to any one of a plurality of said voltage tap means.

7. The circuit arrangement according to claim 4, wherein said supply voltage switching means comprise an operational amplifier including a controllable output transistor circuit for interconnecting the respective bridge branch to said voltage supply source.

8. The circuit arrangement according to claim 7, wherein said controllable output transistor circuit comprises a controllable collector output.

9. The circuit arrangement according to claim 7, comprising a measurement diagonal, impedance convertor means and means for connecting said impedance convertor means to said operational amplifier as well as to said measurement diagonal.

10. The circuit arrangement according to claim 1, comprising in addition to said plurality of bridge branches, at least one compensating bridge branch and a respective compensating resistor means in said compensating bridge branch, further switching means connecting said compensating resistor means to said voltage source, further voltage tap means located between said compensating resistor means and said further switching means, said circuit comprising further supply voltage control means also connected to said voltage source, and further feedback circuit means connecting said further voltage tap means to said further supply voltage control means whereby the supply voltage available at said further voltage tap means is also adjustable to keep it at a predetermined value.

11. A measuring bridge circuit arrangement comprising a plurality of bridge branches, a respective plurality of measuring points one of which is arranged in each bridge branch, a supply voltage source, supply voltage switching means connected to said supply voltage source and to said bridge branches for selectively interconnecting any bridge branch and said supply voltage source, complementary high impedance half bridge circuit means, and further circuit means for effectively interconnecting any one of said bridge branches and said complementary high impedance half bridge circuit.

12. The circuit arrangement according to claim 11, wherein said further circuit means comprise further switching means arranged to selectively interconnect any one of said bridge branches and said complementary high impedance half bridge circuit.

13. The circuit arrangement according to claim 12, wherein said supply voltage switching means and said further switching means comprise semiconductor switching means.

14. The circuit arrangement according to claim 12, wherein said supply voltage switching means and said further switching means comprise operational amplifier means.

15. The circuit arrangement according to claim 11, wherein said supply voltage source comprises a carrier frequency generator providing a carrier frequency supply voltage and connected through said supply voltage switching means to any one of said plurality of bridge branches, said complementary high impedance half bridge circuit means comprising a resonance circuit tuned to said carrier frequency, said resonance circuit comprising an inductive voltage divider and capacitor means connected in parallel to said inductive voltage divider means.

16. The circuit arrangement according to claim 11, wherein said complementary high impedance half bridge circuit means comprise impedance converter means providing a low impedance output for said high impedance half bridge circuit means, said further circuit means connecting said impedance convertor means to a respective one of said bridge branches.

17. The circuit arrangement according to claim 11, wherein said complementary high impedance half bridge circuit means comprise relatively low-resistance resistors and impedance convertor means connected to provide a relatively high impedance input for said half bridge circuit means.

18. The circuit arrangement according to claim 11, comprising in addition to said plurality of bridge branches, at least one compensating bridge branch and a respective compensating resistor means in said compensating bridge branch, said compensating bridge branch being connected to said complementary high impedance half bridge circuit and to said first mentioned bridge branches, voltage control means including amplitude comparing means having a reference input and further input means connected across said complementary high impedance half bridge circuit, said amplitude comparing means having an output connected to said supply voltage source whereby the supply voltage source is controlled in response to amplitude difference values.

* * * * *